(12) United States Patent
Ishimoto et al.

(10) Patent No.: US 7,181,640 B2
(45) Date of Patent: Feb. 20, 2007

(54) METHOD FOR CONTROLLING AN EXTERNAL STORAGE SYSTEM HAVING MULTIPLE EXTERNAL STORAGE DEVICES

(75) Inventors: Takeshi Ishimoto, Kawasaki (JP); Tohru Sumiyoshi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 10/348,672

(22) Filed: Jan. 22, 2003

(65) Prior Publication Data

US 2003/0140269 A1 Jul. 24, 2003

(30) Foreign Application Priority Data

Jan. 22, 2002 (JP) ............... 2002-013517

(51) Int. Cl.
*G06F 11/00* (2006.01)

(52) U.S. Cl. ....................................... 714/5
(58) Field of Classification Search ............. 714/5; 711/149
See application file for complete search history.

(56) References Cited

U.S. PATENT DOCUMENTS

| | | | | |
|---|---|---|---|---|
| 5,720,028 | A * | 2/1998 | Matsumoto et al. | 714/9 |
| 5,729,763 | A * | 3/1998 | Leshem | 710/38 |
| 5,812,754 | A * | 9/1998 | Lui et al. | 714/6 |
| 5,841,997 | A * | 11/1998 | Bleiweiss et al. | 710/317 |
| 6,154,850 | A * | 11/2000 | Idleman et al. | 714/5 |
| 6,192,027 | B1 * | 2/2001 | El-Batal | 370/222 |
| 6,219,753 | B1 * | 4/2001 | Richardson | 711/114 |
| 6,330,687 | B1 * | 12/2001 | Griffith | 714/6 |
| 6,408,358 | B1 * | 6/2002 | Uchiyama et al. | 711/114 |
| 6,795,934 | B2 * | 9/2004 | Nagata et al. | 714/8 |
| 6,820,212 | B2 * | 11/2004 | Duchesne et al. | 714/7 |
| 6,931,567 | B2 * | 8/2005 | Tanaka et al. | 714/6 |

FOREIGN PATENT DOCUMENTS

| | | |
|---|---|---|
| JP | 08-320768 | 12/1996 |
| JP | 08-328758 | 12/1996 |
| JP | 10-198528 | 7/1998 |
| JP | 2000-347812 | 12/2000 |
| JP | 2001-222385 | 8/2001 |

* cited by examiner

*Primary Examiner*—Robert Beausoliel
*Assistant Examiner*—Amine Riad
(74) *Attorney, Agent, or Firm*—Dillon & Yudell LLP

(57) ABSTRACT

An external storage device is part of a ring-like first route formed by connecting multiple external storage devices to each other via communication channels. The external storage device comprises a first connection unit having a first input port and a first output port, and a second connection unit having a second output port and a second input port that are connected to a first input port and a first output port of an adjacent external storage device on the first route, respectively, to form one communication channel of the first route. When both connection units are enabled, information received by the first input port and the second input port is sent from the second output port and the first output port, respectively. When one of the connection units is disabled, information received by the input port of an enabled connection unit is sent from the output port of the enabled connection unit. If a communication failure has been detected in one communication channel of the first route, connections to the first spare communication channel are enabled, and connections to the failure-detected communication channel are disabled.

4 Claims, 7 Drawing Sheets

METHOD FOR CONTROLLING AN EXTERNAL STORAGE SYSTEM HAVING MULTIPLE EXTERNAL STORAGE DEVICES

RELATED PATENT APPLICATION

The present patent application claims priority to co-pending Japanese Application No. JP 2002-013517, filed on Jan. 22, 2002.

BACKGROUND OF THE INVENTION

1. Technical Field

The present invention relates to external storage devices in general, and, in particular, to an external storage system having multiple external storage devices. Still more particularly, the present invention relates to a method for controlling an external storage system having multiple external storage devices.

2. Description of the Related Art

In a data processing system in which multiple external storage devices are connected to a single hub, when one external storage device is rendered incapable of communication due to a cable or device failure, the hub reconstructs a communication channel by disabling a connection between that external storage device and the hub. However, once the connection between the external storage device and the hub is disabled, the external storage device cannot communicate with external systems even if the external storage device itself is operating normally. Consequently, it is desirable to provide a method for controlling an external storage system having multiple external storage devices.

SUMMARY OF THE INVENTION

The present invention provides an external storage system having multiple external storage devices that are connected in a ring configuration to form a first route by connecting the external storage devices to each other via communication channels. The external storage device includes a first connection unit, a second connection unit, a connection control unit, a connection failure detection unit, a connection failure recovery unit. The first connection unit has a first input port and a first output port. The second connection unit has a second output port and a second input port connected to a first input port and a first output port of an adjacent external storage device on the first route, respectively, to form one communication channel of the first route. The connection control unit causes the second output port and the first output port to send information received by the first input port and the second input port, respectively, when both of the first connection unit and the second connection unit are enabled. The connection control unit also causes the output port of an enabled connection unit to send information received by the input port of the enabled connection unit when one of the connection units is disabled. The connection failure detection unit detects a communication failure in each of the connection units. The connection failure recovery unit enables one of the connection units if a communication failure has been detected in one communication channel of the first route, and the one connection unit is connected to the first spare communication channel. The connection failure recovery unit also disables one of the connection units if a communication failure has been detected in one of the connection units.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
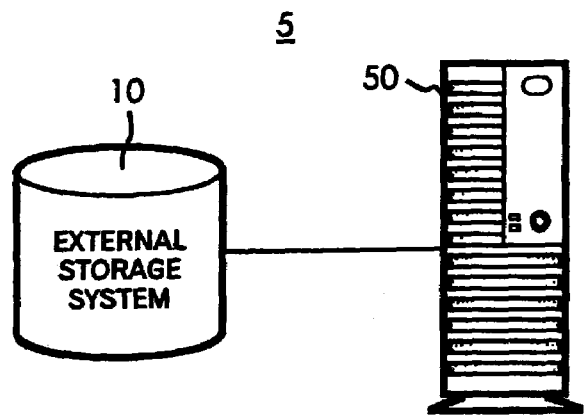
FIG. 1 is a diagram of a data processing system having an external storage system, in accordance with a preferred embodiment of the present invention.

FIG. 1 depicts a data processing system 5 having an external storage system 10 and a host computer 50. As shown, external storage system 10 is connected to host computer 50. A user sends an access request to external storage system 10 using host computer 50. Upon receiving the access request from host computer 50, external storage system 10 stores data that have been received from host computer 50, or returns stored data to host computer 50 according to the access request.

Figure 2:
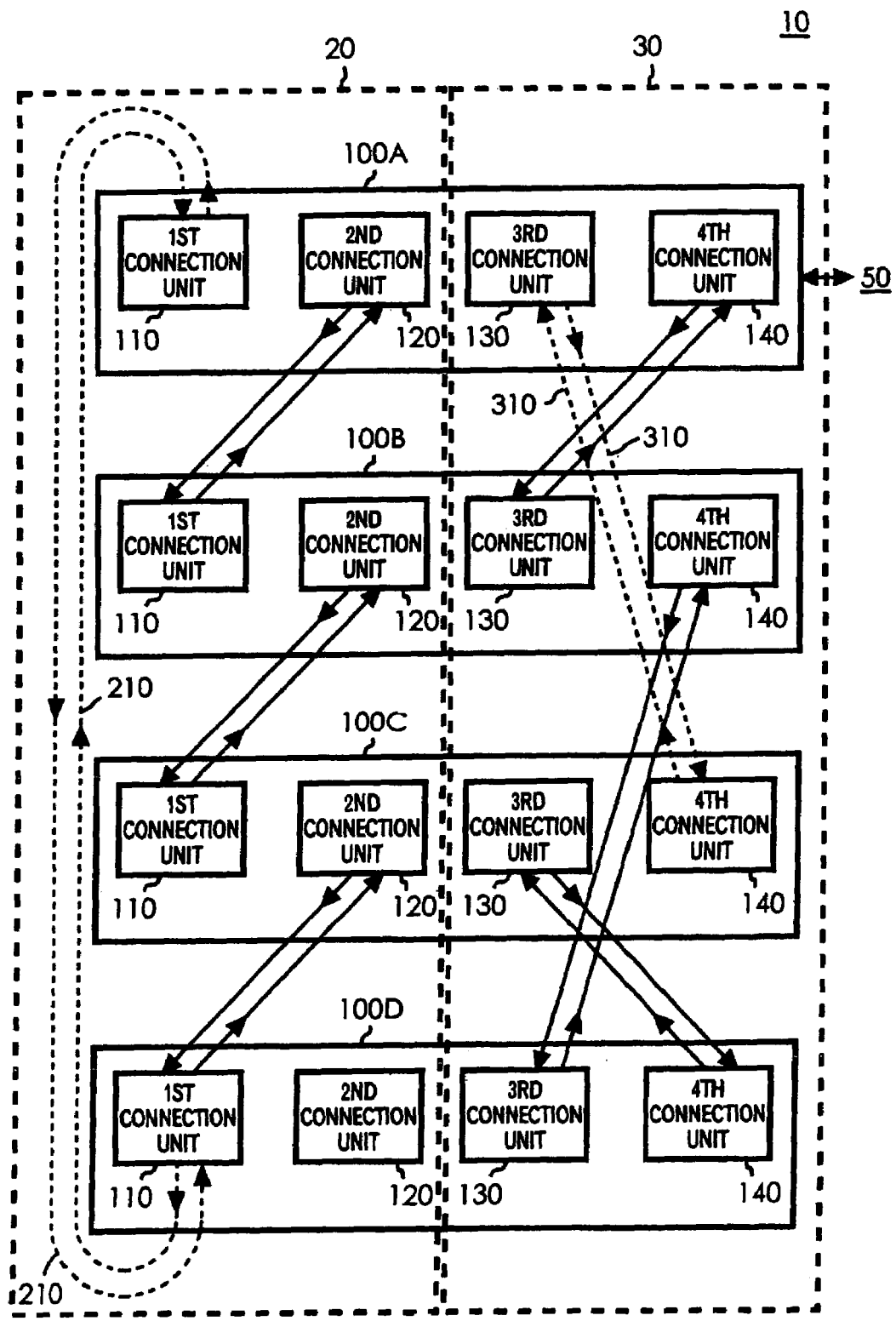
FIG. 2 is a diagram showing internal connections of the external storage system from FIG. 1.

FIG. 2 shows internal connections of external storage system 10. As shown, external storage system 10 is provided with external storage devices 100A–100D, a first route 20, a first spare communication channel 210, a second route 30, and a second spare communication channel 310. Each of external storage devices 100A–100D has a first connection unit 110, a second connection unit 120, a third connection unit 130, and a fourth connection unit 140. In external storage system 10, external storage devices 100A–100D are provided on first route 20 and second route 30. External storage devices 100A–100D are connected to each other via a bidirectional route that goes through external storage devices 100A–100D in such order. External storage device 100A and external storage device 100D that are located at the two ends of the bidirectional route send data that have been received from external storage device 100B and external storage device 100C back to external storage device 100B and external storage device 100C, respectively. Thus, external storage devices 100A–100D communicate through loop-shaped first route 20 that goes through external storage devices 100A–100D in such order, wraps at external storage device 100D, and then goes through external storage devices 100D–100A in such order.

If a failure has occurred in a certain communication channel of first route 20 or second route 30, the external storage devices connected to the communication channel where the failure has occurred disable the connection where the failure has occurred. On the other hand, the external storage devices enable a spare communication channel for the route including the communication channel where the failure has occurred. External storage devices 100 reconstruct a loop-shaped route by sending control information for enabling or disabling a connection through the route where the failure has not occurred. In this manner, for example, when a failure has occurred between external storage device 100B and external storage device 100C on first route 20, external storage device 100A reconstructs a loop-shaped route that goes through external storage device 100B, external storage device 100A, external storage device 100D, and external storage device 100C in such order, whereby external storage device 100A can recover the communication with external storage device 100D.

First route 20 is formed in a manner that external storage devices 100A–100D are connected to each other. That is, each of first connection unit 110 and second connection unit 120 is connected, one to one, to second connection unit 120 or first connection unit 110 of the adjacent external storage device on first route 20 to thereby form one communication channel.

Each of first connection unit 110 and second connection unit 120 of external storage devices 100A–100D is set in an enabled state or a disabled state. If both of first connection unit 110 and second connection unit 120 are set in an enabled state, external storage devices 100A–100D cause second connection unit 120 to send information received by first connection unit 110, and cause first connection unit 110 to send information received by second connection unit 120. On the other hand, if first connection unit 110 is set in an enabled state and second connection unit 120 is set in a disabled state, external storage devices 100A–100D cause first connection unit 110 to send information received by first connection unit 110. Similarly, if first connection unit 110 is set in a disabled state and second connection unit 120 is set in an enabled state, external storage devices 100A–100D cause second connection unit 120 to send information received by second connection unit 120.

First spare communication channel 210 is rendered disabled when each external storage device 100 communicates normally through first route 20, and is rendered enabled if necessary when a failure has occurred in communication that is performed by external storage devices 100 through first route 20. Specifically, if a failure has occurred in a connection excluding first spare communication channel 210 among the communication channels constituting first route 20, external storage devices 100A–100D disable the connection where the failure has occurred and enable first spare communication channel 20 to recover from the failure.

First spare communication channel 210 may be any connection on first route 20. For example, first spare communication channel 210 may be a connection between external storage device 100A and external storage device 100B, a connection between external storage device 100B and external storage device 100C, or a connection between external storage device 100C and external storage device 100D.

Second route 30 is formed in a manner that external storage devices 100A–100D are connected to each other. That is, each of third connection unit 130 and fourth connection unit 140 is connected, one to one, to fourth connection unit 140 or third connection unit 130 of the adjacent external storage device on second route 30.

On first route 20, external storage device 100A is adjacent to external storage device 100B and external storage device 100D. In contrast, on second route 30, external storage device 100A is adjacent to external storage device 100B and external storage device 100C. In this manner, at least one external storage device has different combinations of external storage devices adjacent to it on first route 20 and second route 30.

The two ends of first spare communication channel 210 are external storage device 100A and external storage device 100D. In contrast, the two ends of second spare communication channel 310 are external storage device 100A and external storage device 100C.

The functions of third connection unit 130 and fourth connection unit 140, and the roles of second spare communication channel 310 on second route 30 are the same as the functions of first connection unit 110 and second connection unit 120, and the roles of first spare communication channel 210 on first route 20, respectively. Thus, those functions will not be further described.

Figure 3:
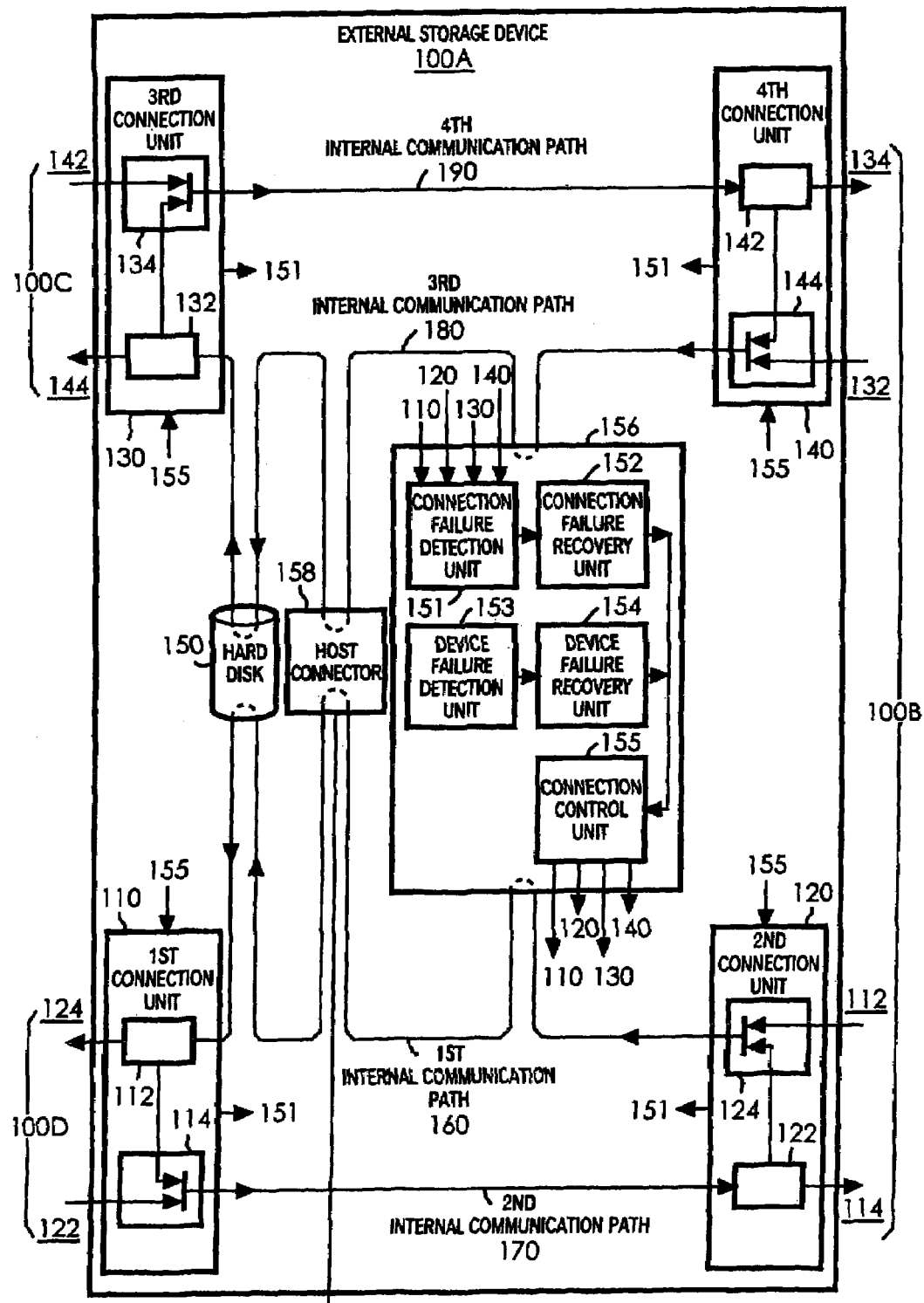
FIG. 3 is a functional block diagram of an external storage device within the external storage system from FIG. 1, in accordance with a preferred embodiment of the present invention.

FIG. 3 is a functional block diagram of external storage device 100A. External storage device 100A is equipped with first connection unit 110, second connection unit 120, third connection unit 130, fourth connection unit 140, a hard disk 150, a control device 156, a host connector 158, a first internal communication path 160, a second internal communication path 170, a third internal communication path 180, and a fourth internal communication path 190. First connection unit 110 has a first output port 112 and a first input port 114. Second connection unit 120 has a second output port 122 and a second input port 124. Third connection unit 130 has a third output port 132 and a third input port 134. Fourth connection unit 140 has a fourth output port 142 and a fourth input port 144. Control device 156 has a connection failure recovery unit 152, a device failure recovery unit 154, a connection control unit 155, a connection failure detection unit 151, and a device failure detection unit 153. Control device 156 connected to first internal communication path 160 and third internal communication path 180 may also be connected to second internal communication path 170 and fourth internal communication path 190.

External storage devices 100B–100D have similar configurations as external storage device 100A. Some of external storage devices 100B–100D may not be equipped with host connector 158. Even if equipped with host connector 158, external storage devices 100B–100D may be used in such a form as not to be connected to host computer 50.

First connection unit 110 of external storage device 100A is connected to second connection unit 120 of external storage device 100D. That is, first output port 112 and first input port 114 are connected to second input port 124 and second output port 122 of external storage device 100D, respectively.

First output port 112 acquires data from first internal communication path 160 and sends the data to first input port 114 and second input port 124 of external storage device 100D. First input port 114 receives data from first output port 112 or second output port 122 of external storage device 100D according to an instruction from connection control unit 155, and sends the data to second internal communication path 170. More specifically, if first connection unit 110 is set in an enabled state, first input port 114 receives data from second output port 122 of external storage device 100D. On the other hand, if first connection unit 110 is set in a disabled state, first input port 114 receives data from first output port 112.

Second connection unit 120 of external storage device 100A is connected to first connection unit 110 of external storage device 100B. That is, second output port 122 and second input port 124 are connected to first input port 114 and first output port 112 of external storage device 100B, respectively.

Second output port 122 acquires data from second internal communication path 170 and sends the data to second input port 124 and first input port 114 of external storage device 100B. Second input port 124 receives data from second output port 122 or first output port 112 of external storage device 100B according to an instruction from connection control unit 155, and sends the data to first internal communication path 160. More specifically, if second connection unit 120 is set in an enabled state, second input port 124 receives data from first output port 112 of external storage device 100B. On the other hand, if second connection unit 120 is set in a disabled state, second input port 124 receives data from second output port 122.

Third connection unit 130 and fourth connection unit 140 operate in similar manners as first connection unit 110 and second connection unit 120. The operations of third connection unit 130 and fourth connection unit 140 may be described by replacing first connection unit 110, second connection unit 120, first output port 112, second output port 122, first input port 114, second input port 124, first internal communication path 160, second internal communication path 170, and external storage device 110D in the above descriptions of first connection unit 110 and second connection unit 120 with third connection unit 130, fourth connection unit 140, third output port 132, fourth output port 142, third input port 134, fourth input port 144, third internal communication path 180, fourth internal communication path 190, and external storage device 100C, respectively.

Hard disk 150 is provided on first internal communication path 160 and third internal communication path 180. Data are written to hard disk 150 according to a request received from first internal communication path 160 or third internal communication path 180. Data are read from hard disk 150 and output to first internal communication path 160 or third internal communication path 180 according to a request received from first internal communication path 160 or third internal communication path 180.

Hard disk 150 may also be connected to second internal communication path 170 or fourth internal communication path 190. Alternatively, hard disk 150 may be provided in such a manner as not to be provided on third internal communication path 180 and to be provided on only first internal communication path 160. Each external storage device may be equipped with multiple hard disks 150. Further, hard disk 150 may be equipped with a Fibre Channel interface and is capable of communicating with another device over first internal communication path 160 that is part of a Fibre Channel-Arbitrated Loop.

Connection failure detection unit 151 detects a communication failure in first connection unit 110, second connection unit 120, third connection unit 130, or fourth connection unit 140, and then informs connection failure recovery units 152 of external storage devices 100 connected to the two ends of a communication channel where the failure has occurred about the occurrence of a failure. If a communication failure is detected in first connection unit 110 or second connection unit 120, connection failure detection unit 151 sends information indicating that the communication failure has been detected to the respective connection failure recovery units 152 of external storage device 100A and external storage device 100D that are connected to the two ends of first spare communication channel 210 via third internal communication path 180. On the other hand, if a communication failure is detected in third connection unit 130 or fourth connection unit 140, connection failure detection unit 151 sends information indicating that the communication failure has been detected to the respective connection failure recovery units 152 of external storage device 100A and external storage device 100C that are connected to the two ends of second spare communication channel 310 via first internal communication path 160.

Connection failure detection unit 151 may determine that a communication failure has occurred when error and timeout frequencies in the communication performed by external storage device 100 are higher than predetermined values. Connection failure detection unit 151 may also determine that a communication failure has occurred when a cable connecting external storage devices 100 has been cut.

After receiving, from the connection failure detection unit 151, information indicating that a communication failure has occurred, connection failure recovery unit 152 then sends, to connection control unit 155, an instruction to disable the connection unit where the communication failure has occurred. Specifically, connection failure recovery unit 152 sends an instruction to set first connection unit 110, second connection unit 120, third connection unit 130, or fourth connection unit 140 that is located at the two ends of the connection where the failure has occurred, to a disabled state. If connection failure recovery unit 152 has received, from connection failure detection unit 151, information indicating that a failure has been detected in a certain communication channel of first route 20, and if first connection unit 110 or second connection unit 120 is connected to first spare communication channel 210, connection failure recovery unit 152 sends, to connection control unit 155, an instruction to enable the connection unit concerned. Similarly, if connection failure recovery unit 152 has received, from connection failure detection unit 151, information indicating that a communication failure has been detected in a certain connection unit of second route 30, and if third connection unit 130 or fourth connection unit 140 is connected to second spare communication channel 310, connection failure recovery unit 152 sends, to connection control unit 155, an instruction to enable the connection unit concerned.

Device failure detection unit 153 detects a failure in external storage device 100 through first internal communication path 160 and third internal communication path 180. Device failure detection unit 153 sends information indicating that failing external storage device 100 has been detected to device failure recovery units 154 of external storage devices 100 adjacent to failing external storage device 100 via first internal communication path 160 or third internal communication path 180. Further, device failure detection unit 153 sends information indicating that failing external storage device 100 has been detected to device failure recovery units 154 of external storage devices 100 connected to the two ends of first spare communication channel 210 and second spare communication channel 310 via first internal communication path 160 or third internal communication path 180. Device failure detection unit 153 may detect a failure in external storage device 100 using a control line dedicated to failure detection.

Device failure detection unit 153 may conclude that external storage device 100 having hard disk 150 has failed when detecting a failure of a motor or a head of hard disk 150. Also, device failure detection unit 153 may conclude that external storage device 100 has failed when supply of power to external storage device 100 has stopped or the control circuit of external storage device 100 has stopped operating. A failure in an external storage device 100 may be detected by either a device failure detection unit 153 of that external storage device 100 or a device failure detection unit 153 of another external storage device. In particular, when a device failure detection unit 153 of an external storage device 100 cannot detect a failure, such as power down, in that external storage device, a device failure detection unit 153 of another external storage device detects such a failure in that external storage device.

After receiving information indicating that a failing external storage device 100 has been detected, device failure recovery unit 154 sends, to connection control unit 155, an instruction to disable first connection unit 110, second connection unit 120, third connection unit 130, and fourth connection unit 140 that are connected to failing external storage device 100. If device failure recovery unit 154 has received, from device failure detection unit 153, information indicating that a failing external storage device 100 has been detected, if first connection unit 110 or second connection unit 120 is connected to first spare communication channel 210, and if first spare communication channel 210 is connected to a different external storage device than failing external storage device 100, device failure recovery unit 154 sends, to connection control unit 155, an instruction to enable the connection unit connected to first spare communication channel 210. If device failure recovery unit 154 has received, from device failure detection unit 153, information indicating that a failing external storage device 100 has been detected, if third connection unit 130 or fourth connection unit 140 is connected to second spare communication channel 310, and if second spare communication channel 310 is connected to a different external storage device than failing external storage device 100, device failure recovery unit 154 sends, to connection control unit 155, an instruction to enable the connection unit connected to second spare communication channel 310.

Connection control unit 155 receives, from connection failure recovery unit 152 and device failure recovery unit 154, an instruction to enable or disable first connection unit 110, second connection unit 120, third connection section 130, or fourth connection unit 140. In response to the received instruction, connection control unit 155 sets first connection unit 110, second connection unit 120, third connection section 130, and fourth connection unit 140 in an enabled state or a disabled state.

Host connector 158 is connected to host computer 50. Host connector 158 receives, from host computer 50, a request for access to hard disk 150 and sends it to first internal communication path 160 or third internal communication path 180. Host connector 158 may acquire a result of the access request from hard disk 150 via first internal communication path 160 or third internal communication path 180, and send it to host computer 50. Host connector 158 connected to first internal communication path 160 and third internal communication path 180 may also be connected to second internal communication path 170 and fourth internal communication path 190.

Figure 4:
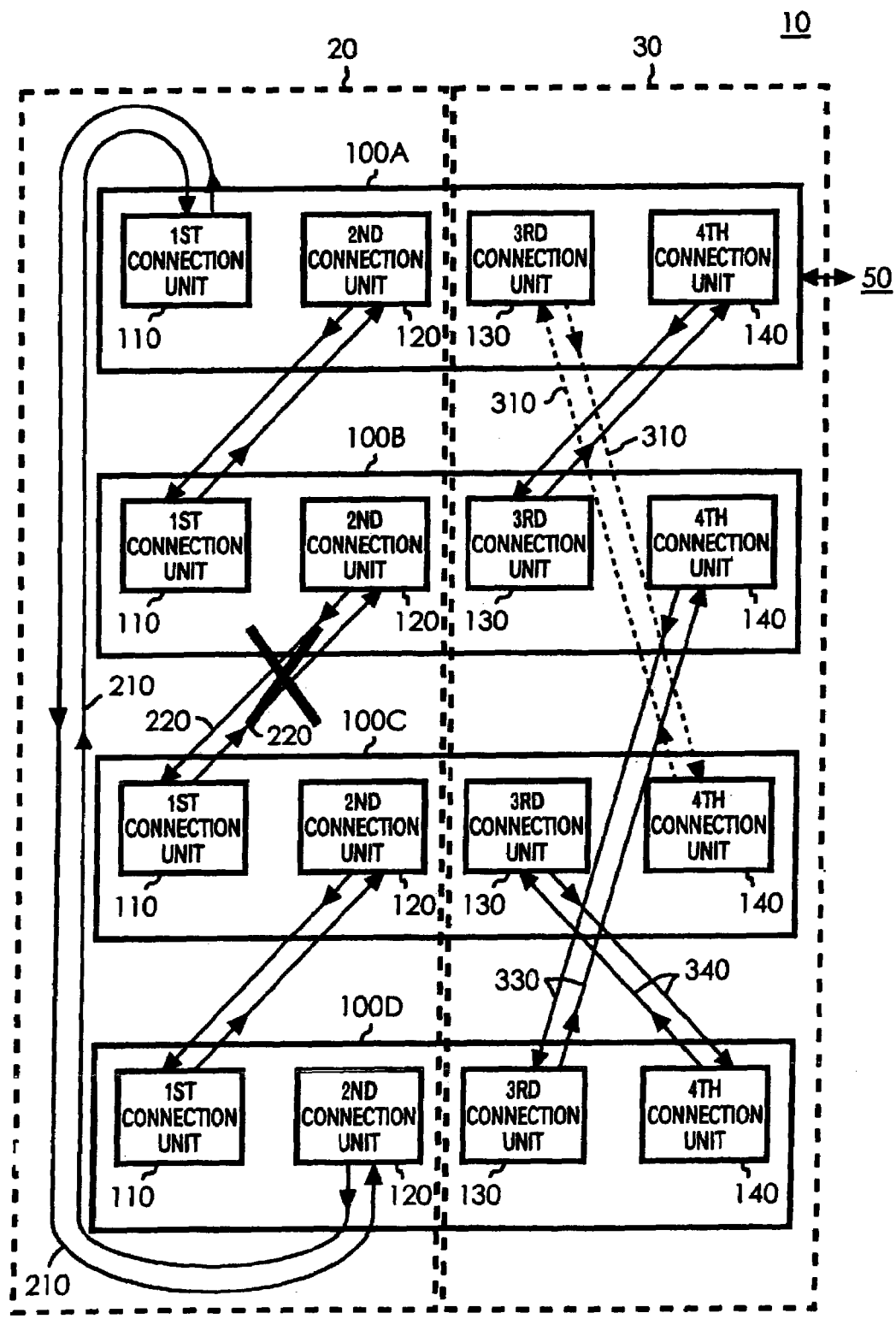
FIG. 4 is a diagram illustrating a series of operations from detection of a connection failure in the external storage system from FIG. 2 until recovery from the failure.

FIG. 4 is a diagram illustrating a series of operations from detection of a connection failure in external storage system 10 shown in FIG. 2 until recovery from the failure. Normally, external storage device 100A performs communication using entire first route 20 excluding first spare communication channel 210. Now assume that connection failure detection unit 151 of external storage device 100B has detected a communication failure in a first communication channel 220 that is one of the communication channels constituting first route 20. In this case, external storage device 100A cannot communicate with external storage device 100C and external storage device 100D.

In the above-stated situation, connection failure detection unit 151 of external storage device 100B detects the failure in first communication channel 220 and informs connection failure recovery units 152 of respective external storage devices 100A–100D about the detection of the failure. In response, connection failure recovery unit 152 within external storage device 100B sends connection control unit 155 an instruction to disable second connection section 120. Within external storage device 100C, connection failure recovery unit 152 sends connection control unit 155 an instruction to disable first connection section 110. In addition, within external storage device 100A, connection failure recovery unit 152 sends connection control unit 155 an instruction to enable first connection unit 110. Similarly, within external storage device 100D, connection failure recovery unit 152 sends connection control unit 155 an instruction to enable second connection unit 120.

In each of external storage devices 100A–100D, connection control unit 155 enables or disables first connection unit 110 and second connection unit 120 according to an instruction from connection failure recovery unit 152. In this manner, connection failure detection units 151, connection failure recovery units 152, and connection control units 155 disable the connection units at the two ends of first communication channel 220 and enable the connection units at the two ends of first spare communication channel 210. With the above-mentioned operations, a channel that enables communication can be secured again on first route 20. In FIG. 4, the secured channel that enables communication is indicated by solid lines.

If communication failures are detected in first connection unit 110 and second connection unit 120, connection failure detection unit 151 then sends information indicating that the communication failures have been detected to the other external storage devices using second route 30. For example, when connection failure detection unit 151 of external storage device 100B has detected such communication failures, external storage device 100B sends information indicating that the communication failures have been detected to connection failure recovery unit 152 of external storage device 100C via a second communication channel 330 and a third communication channel 340. In this manner, even if a failure has occurred in any connection on first route 20, connection failure detection units 151 and connection failure recovery units 152 can perform processing for recovery from the failure.

Even if a failure has been detected in a communication channel on second route 30, connection failure detection units 151 can perform processing for recovery from the failure in a similar manner using first route 20. Such recovery processing is similar to the above-described procedure to be performed for a failure in first route 20 and hence will not be described further in detail.

Figure 5:
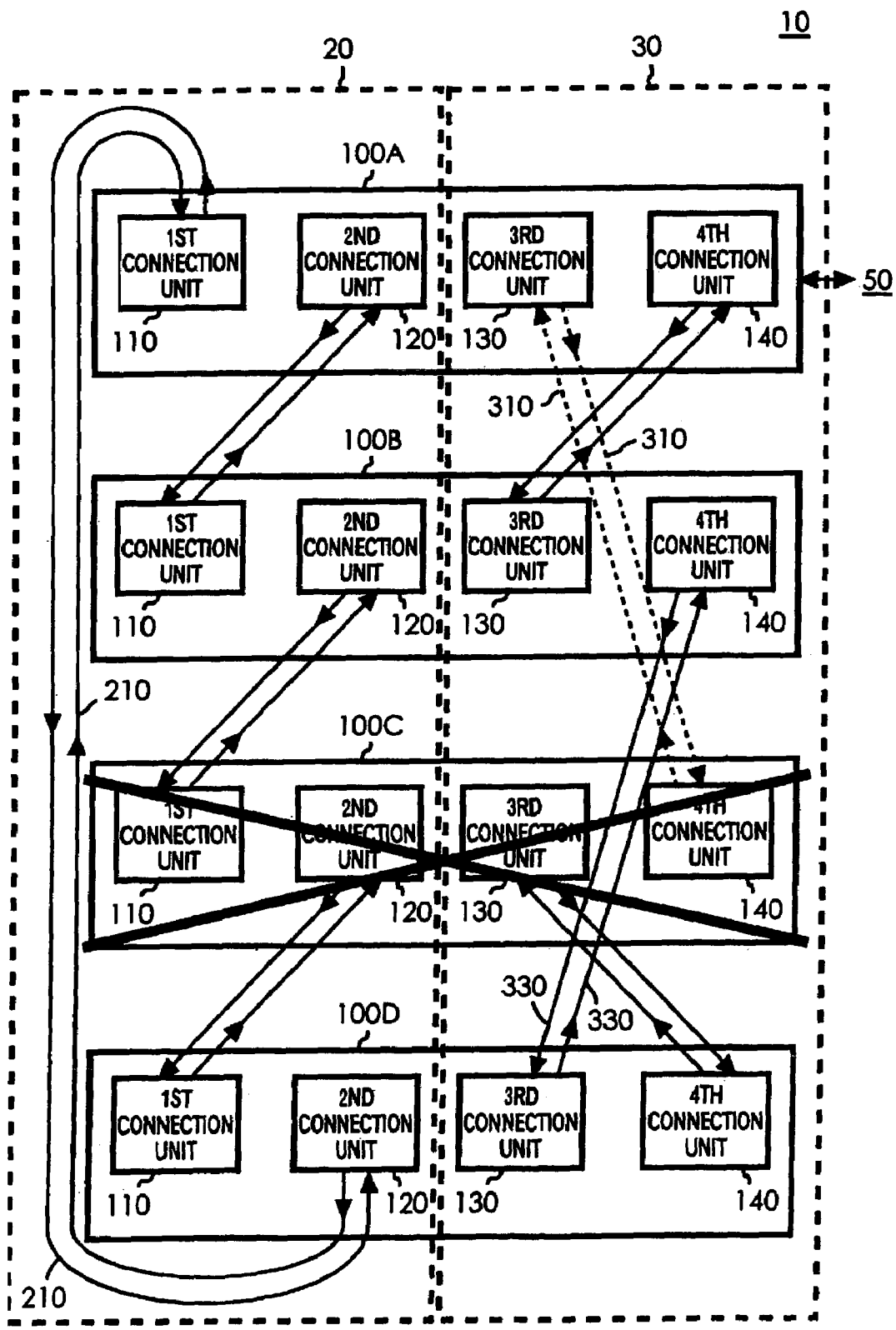
FIG. 5 is a diagram illustrating operations to be performed when a failure has been detected in the external storage device from FIG. 2.

FIG. 5 is a diagram illustrating operations to be performed when a failure has been detected in external storage device 100C. Normally, external storage device 100A performs communication using first route 20 excluding first spare communication channel 210. Now assume that device failure detection unit 153 of external storage device 100C has detected a failure in external storage device 100C. In this case, external storage device 100A cannot communicate with external storage device 100D.

In this situation, device failure detection unit 153 of external storage device 100C sends device failure recovery units 154 of respective external storage devices 100A–100D information indicating that a failure has occurred in external storage device 100C. In response, within external storage device 100B, device failure recovery unit 154 sends connection control unit 155 an instruction to disable second connection unit 120. Similarly, within external storage device 100D, device failure recovery unit 154 sends connection control unit 155 an instruction to disable first connection unit 110. Further, within external storage section 100A, device failure recovery unit 154 sends connection control unit 155 an instruction to enable first connection unit 110. Similarly, within external storage section 100D, device failure recovery unit 154 sends connection control unit 155 an instruction to enable second connection unit 120.

In each of external storage devices 100A–100D, connection control unit 155 enables or disables first connection unit 110 and second connection unit 120 according to an instruction from device failure recovery unit 154. With the above-described operations, a channel that enables communication can be secured again on first route 20 without going through external storage device 100C. In FIG. 5, the secured channel that enables communication is indicated by solid lines.

Instead of device failure detection unit 153 of external storage device 100C, device failure detection unit 153 of external storage device 100B may detect occurrence of a failure in external storage device 100C. In the latter case, external storage device 100B sends a control signal to external storage device 100D via second communication channel 330. When a failure has occurred in external storage device 100C, external storage device 100B cannot communicate with external storage device 100D using first route 20 but can communicate with external storage device 100D using second route 30 in this manner. As such, device failure detection units 153 increase the possibility of success in failure recovery when a failure has occurred in any of external storage devices 100A–100D.

Figure 6:
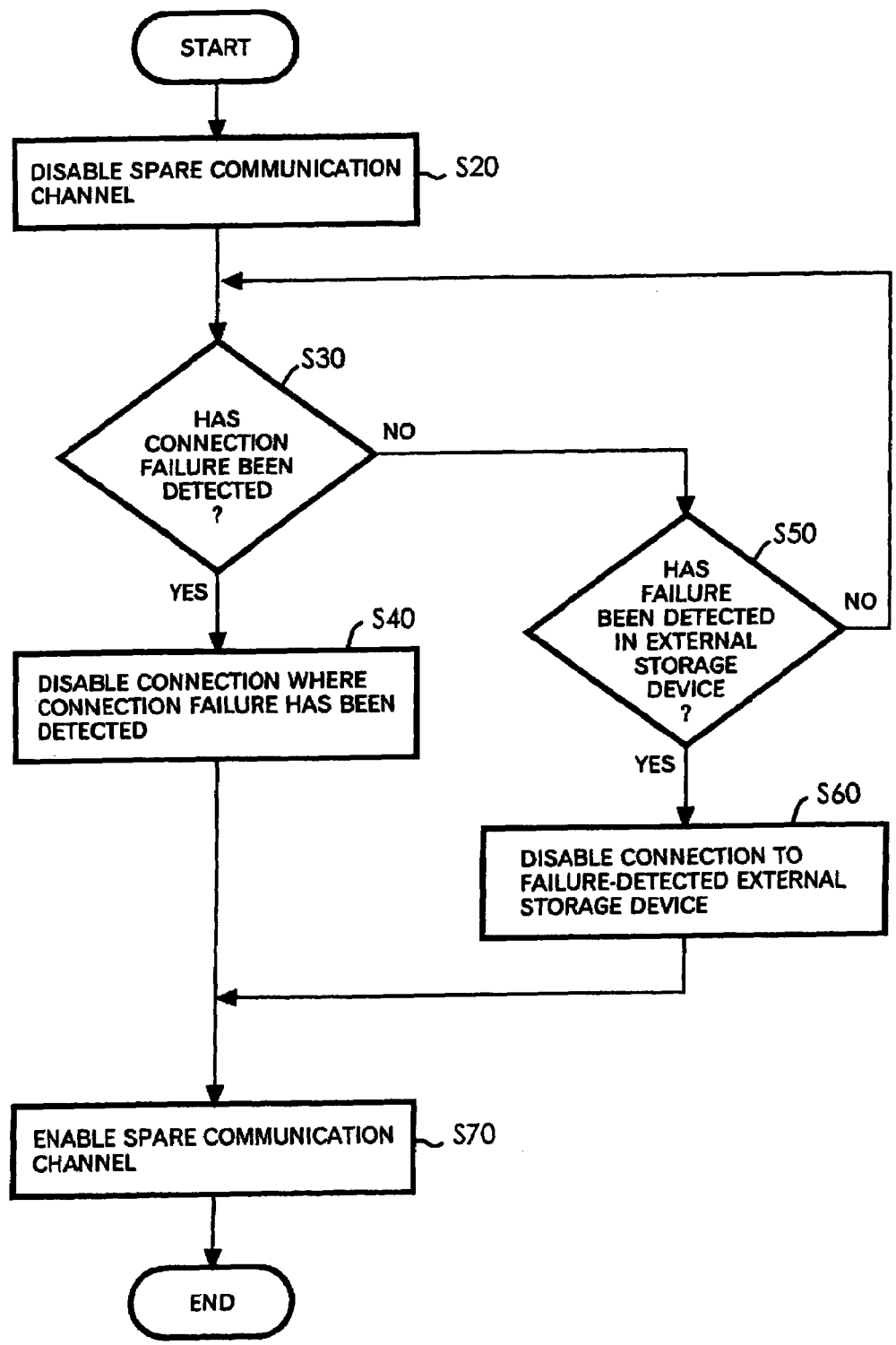
FIG. 6 is a flowchart showing communication control of the external storage system from FIG. 2.

FIG. 6 is a flowchart showing connection control of external storage system 10. External storage devices 100 disable spare communication channel (S20). Connection failure detection units 151 continue to detect for a connection failure (S30). If connection failure detection unit 151 has detected a connection failure (S30: YES), connection failure recovery units 152 disable the connection where the failure has been detected (S40). If no connection failure has been detected (S30: NO), device failure detection units 153 continue to detect for a failure in external storage devices 100 (S50). If device failure detection unit 153 has detected a failure in an external storage device 100 (S50: YES), device failure recovery units 154 disable the connections to failure-detected external storage device 100 (S60). External storage system 10 enables spare communication channel (S70). In the flowchart of FIG. 6, the operation to be performed when the device failure detection units 153 have not detected any failure in the external storage devices (S50: NO) is repeated regularly. The operation shown in FIG. 6 is performed independently for communications over first route 20 and communications over second route 30.

Figure 7:
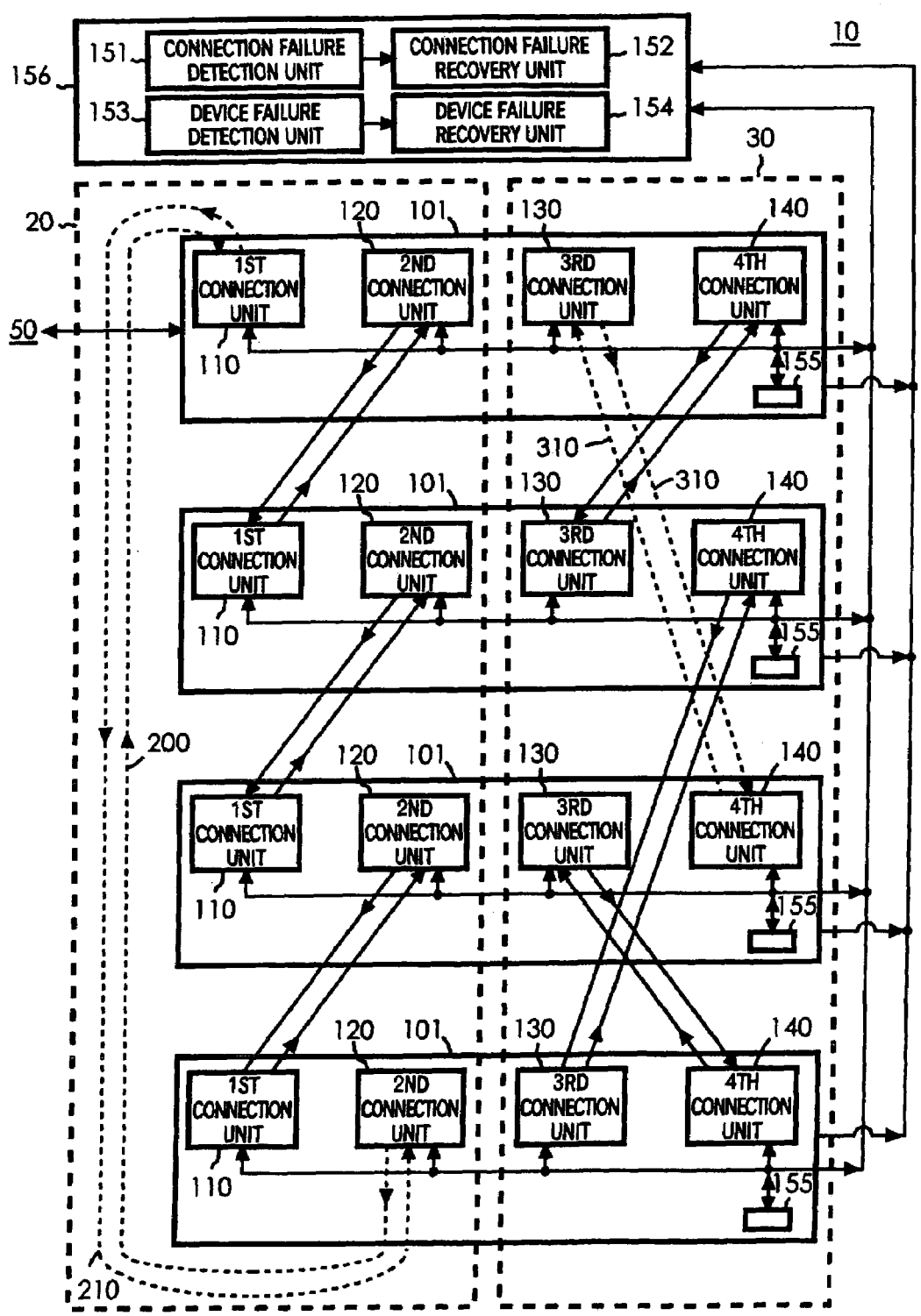
FIG. 7 is a diagram showing a modification of the external storage system from FIG. 2.

FIG. 7 is a diagram showing a modification of external storage system 10. As shown, control device 156 is not provided in each of external storage devices 100A–100D but outside external storage units 101. Control device 156 has a connection failure recovery unit 152, a device failure recovery unit 154, a connection failure detection unit 151, and a device failure detection unit 153. Since each external storage unit 101 is approximately the same in configuration as each external storage device 100 except that control device 156 is removed and a connection control unit 155 is provided in place of control device 156, the configuration of each external storage unit 101 will not be described. Control device 156 is connected to first connection units 110, second connection units 120, third connection units 130, and fourth connection units 140 as well as to connection control units 155 of the respective external storage units 101.

Connection failure detection unit 151 receives failure information relating to transmission and reception of data from first connection units 110, second connection units 120, third connection units 130, and fourth connection units 140. Connection failure detection unit 151 sends the received failure information to connection failure recovery unit 152.

After receiving the failure information from connection failure detection unit 151, connection failure recovery unit 152 disables a connection where the failure has occurred and enables first spare communication channel 210 or second spare communication channel 310. That is, connection failure detection unit 151 sends, to connection control units 155 of respective external storage units 101, an instruction to disable first connection unit 110, second connection unit 120, third connection unit 130, and fourth connection unit 140 that are located at the two ends of the failing connection. Then, connection failure detection unit 151 sends, to connection control units 155 of respective external storage units 101, an instruction to enable first connection unit 110, second connection unit 120, third connection unit 130, and fourth connection unit 140 that are located at the two ends of first spare communication channel 210 or second communication channel 310.

Device failure detection unit 153 receives, from each external storage unit 101, information relating to a failure thereof. Device failure detection unit 153 sends the received failure information to device failure recovery unit 154.

Device failure recovery unit 154 disables connections to the failing external storage unit, and enables first spare communication channel 210 or second spare communication channel 310 if necessary. That is, device failure recovery unit 154 sends, to connection control units 155 of respective external storage units 101, an instruction to disable first connection unit 110, second connection unit 120, third connection unit 130, and fourth connection unit 140 that are connected to failing external storage unit 101. Then, if necessary, device failure recovery unit 154 sends, to connection control units 155 of respective external storage units 101, an instruction to enable first connection unit 110, second connection unit 120, third connection unit 130, and fourth connection unit 140 that are located at the two ends of first spare communication channel 210 or second spare communication channel 310.

Figure 8:
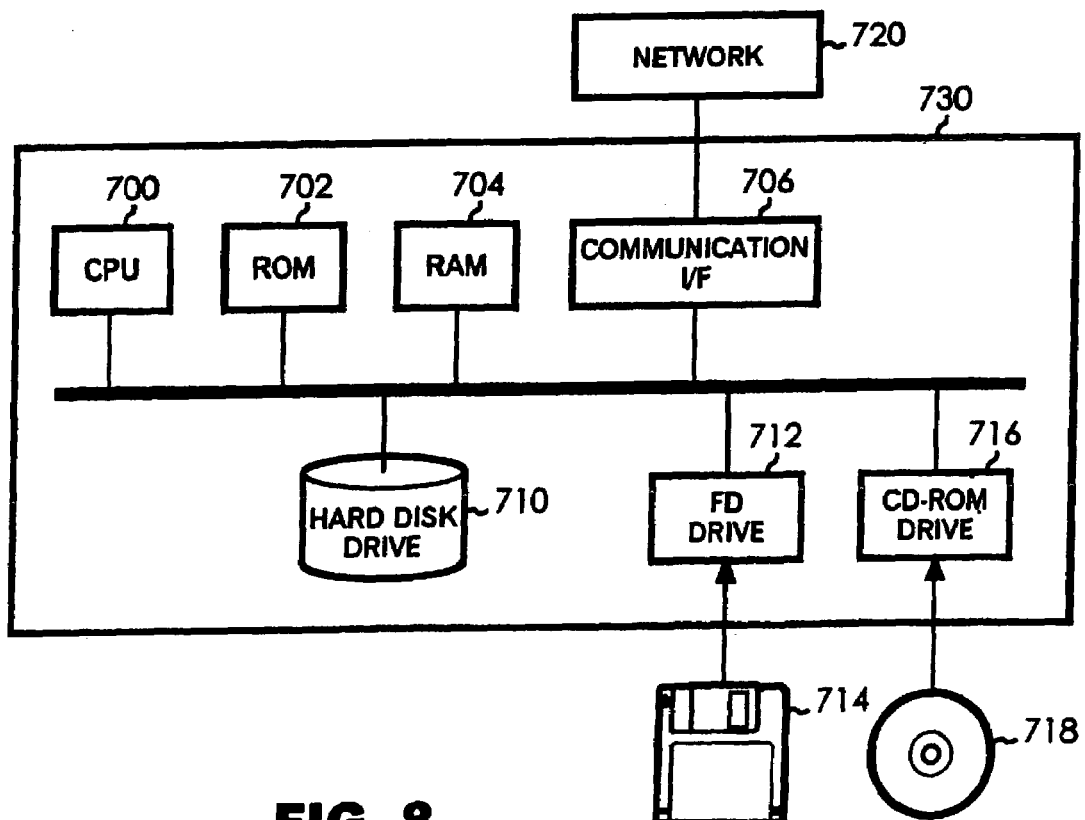
FIG. 8 is a diagram showing a hardware configuration of a control device for the external storage system from FIG. 2, in accordance with a preferred embodiment of the present invention.

FIG. 8 shows an exemplary hardware configuration of control device 156 in accordance with a preferred embodiment of the present invention. The functions of control device 156 according to the embodiment are realized through cooperation between a computer 730 that is equipped with a central processing unit (CPU) 700, a read-only memory (ROM) 702, a random-access memory (RAM) 704, a communication interface 706, and a hard disk drive 710, and programs that are executed on computer 730. Computer 730 may also be equipped with a floppy disk drive 712 and/or a CD-ROM drive 716.

The programs that realize control device 156 include a connection failure detection module, a connection failure recovery module, a device failure detection module, a device failure recovery module, and a connection control module. These modules are programs for causing computer 730 to operate as connection failure detection unit 151, connection failure recovery unit 152, device failure detection unit 153, device failure recovery unit 154, and connection control unit 155.

The above programs or modules may be stored in an external storage medium. The storage medium may be a flexible disk 714, a CD-ROM 718, or other medium, e.g., an optical recording medium such as a DVD or a PD, a magneto-optical recording medium such as an MD, a tape medium, or a semiconductor memory such as an IC card. Alternatively, a storage device such as a hard disk or a RAM provided in a server system connected to a dedicated communication network or the Internet may be used as a recording medium, and the programs may be supplied to computer 730 over a network 720.

While the invention has been particularly shown and described with reference to a preferred embodiment, it will be understood by those skilled in the art that various changes in form and detail may be made therein without departing from the spirit and scope of the invention.

What is claimed is:

1. An external storage system comprising:
    a plurality of external storage devices connected to each other in a ring configuration via communication channels, wherein one of said external storage devices includes:
        a first connection unit having a first input port and a first output port, wherein said first input port and said first output port are connected to an output port and an input port, respectively, of a first adjacent external storage device from among said plurality of said external storage devices;
        a second connection unit having a second input port and a second output port, wherein said second input port and said second output port are connected to an output port and an input port, respectively, of a second adjacent external storage device from among said plurality of said external storage devices to form a communication channel; and
        a connection control unit for causing said second output port and said first output port to send information received by said first input port and said second input port, respectively, when said first and second connection units are enabled, and for causing said output port of one of said connection units to send information received by said input port of the other one of said connection units when one of said connection units is disabled.

2. The external storage system of claim 1, further comprising a connection failure detection unit for detecting a communication failure in said connection units.

3. The external storage system of claim 1, further comprising a connection failure recovery unit for enabling one of said connection units if a communication failure has been detected in said communication channel and if said one of said connection units is connected to a spare communication channel, and for disabling said one of said connection units if a communication failure has been detected in said one of said connection units.

4. A method for controlling an external storage system having a plurality of external storage devices connected to each other in a ring configuration via communication channels, said method comprising:
    providing an external storage device comprising a first connection unit having a first input port and a first output port and a second connection unit having a second input port and a second output port;
    connecting said first input port and said first output port to an output port and an input port, respectively, of a first adjacent external storage device from among said plurality of said external storage devices;
    connecting said second input port and said second output port of said second connection unit to an output port and an input port, respectively, of a second adjacent external storage device from among said plurality of external storage devices to form a communication channel;
    causing said second output port and said first output port to send information received by said first input port and said second input port when said first connection unit and said second connection unit are enabled;
    causing the output port of an enabled connection unit to send information received by the input port of said enabled connection unit when one of said connection units is disabled;
    causing said external storage device to communicate with another external storage device such that the connection units are connected to a first spare communication channel, wherein said first spare communication channel is one communication channel of a first route, and is disabled if a communication failure has not been detected;
    enabling one of said connection units if a communication failure has been detected in one communication channel of said first route and said one connection unit is connected to said first spare communication channel; and
    disabling one of said connection units if a communication failure has been detected in said one connection unit.

* * * * *